Mar. 20, 1923.
J. C. F. LONG
STEAM TRAP
Filed July 6, 1920
1,448,972
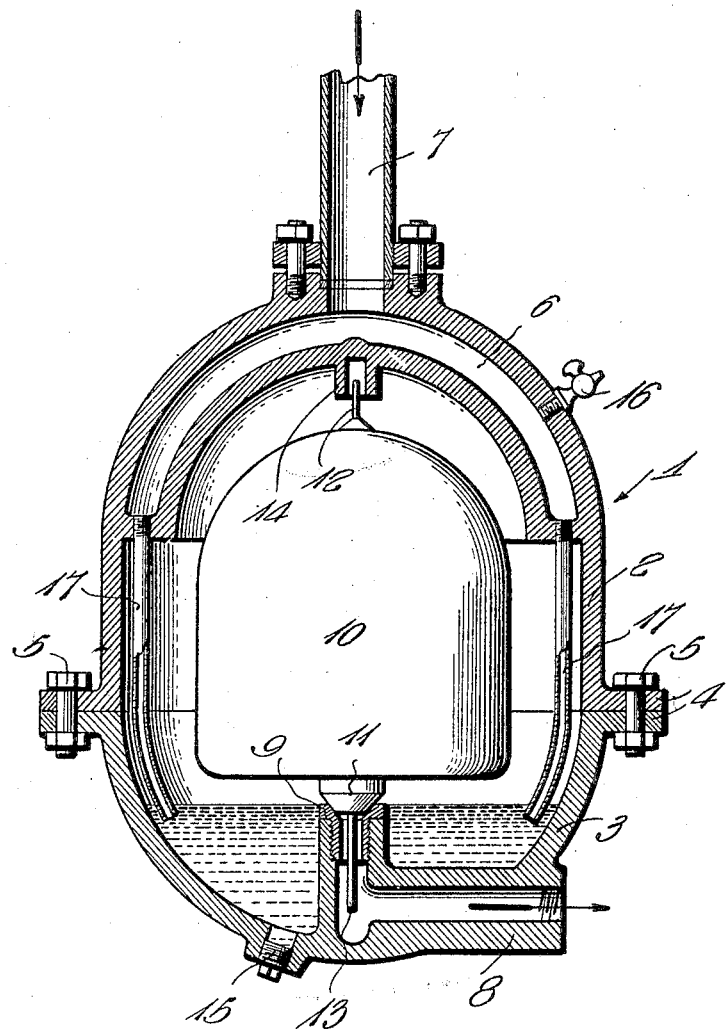
Inventor
J.C.F. Long
By H.B. Willson &Co
Attorneys Patented Mar. 20, 1923.

1,448,972

UNITED STATES PATENT OFFICE.

JOHN C. F. LONG, OF LIMA, OHIO.

STEAM TRAP.

Application filed July 6, 1920. Serial No. 394,259.

*To all whom it may concern:*

Be it known that JOHN C. F. LONG, a citizen of the United States, residing at Lima, in the county of Allen and State of Ohio, has invented certain new and useful Improvements in Steam Traps; and I do declare the following to be a full, clear, and exact description of the invention, such as will enable others skilled in the art to which it appertains to make and use the same.

This invention relates to improvements in steam traps.

The object of the invention is to generally improve upon devices of this class by providing one which includes a condensation collecting chamber and a float chamber which communicate with one another, the first named chamber being equipped with a steam condensate inlet while the remaining chamber is provided with an outlet which is opened and closed by a float controlled valve, the first named chamber being such that it constitutes a guard for the float and prevents the water from coming into direct contact with the same and injuring it.

Another object of the invention is to provide a steam trap which includes the above named chambers, the means of communication of the two chambers being in the form of pipes which extend from the upper chamber down into the lower chamber below the normal water level therein, thus preventing a large water surface from coming into contact with the dry steam.

Other objects and advantages of the invention will be apparent during the course of the following description.

In the drawings, the figure represents a central vertical sectional view of a steam trap constructed in accordance with my invention.

Referring to the drawings wherein the details of construction are clearly illustrated, it will be seen that the numeral 1 designates, as a whole, a substantially spherical casing composed of upper and lower sections 2 and 3 respectively, each of which carries an attaching flange 4 by means of which they are detachably connected together by bolts 5. The upper section 2 of the casing carries an internal integral substantially semispherical steam condensate collecting chamber 6 which collects condensate from a separator by means of the pipe 7 secured thereto in any suitable manner. The lower portion of this section in conjunction with the section 3 constitutes the main water collecting chamber 6ª which is provided at its bottom with a discharge passage 8, the inner end of which extends upwardly and into the interior of this chamber and carries at its upper end a removable seat 9. Disposed in the main chamber is a float 10 equipped with a valve 11 for co-action with the valve seat 9 and at points opposite with each other are guide stems 12 and 13, the first named of which extends into the guide socket 14 while the last named extends downwardly into the upwardly extending portion of the discharge passage 8. For the purpose of cleaning the main chamber of sediment, I provide the latter at its bottom with a removable plug 15. In order to relieve the trap of air when putting into service I provide a relief cock 16. This is for the relief of the condition common to traps which prevents their functioning properly and is known as being "air bound". In addition to the foregoing constructive features, I employ a plurality of pipes 17 which are connected to the collecting chamber 6 and extend downwardly into the main chamber to a point below the normal water level in that chamber. This is a constructional feature to be considered, because by extending the pipes 17 below the water level, the area of the water which comes into contact with the dry steam is very small, and the condensing action of the trap due to this small contact, is negligible. The purpose of the trap being to remove only water which is separated from the steam by other apparatus, it can be seen that the less steam that is condensed by the trap, the more efficient the latter is rendered because it permits this otherwise condensed steam to remain in the line and do work. Any sediment that may enter the trap with the steam may be removed through the plugged hole 15.

In operation, the water from the separator or drum enters the trap through the pipe 7 and passes into the condensate chamber 6. From this chamber it passes through the pipes 17 and into the main or collecting chamber 6ª and when it reaches a level sufficient to raise the float, the valve 11 becomes unseated and a quantity of the water passes out of this chamber through the passage 8. As long as the water level is below the bottom of the float, the latter will remain ineffective, but as soon as the level becomes high enough to raise the float, the valve is opened in the manner already described. Due to the employment of the special pipes 17, it will be seen that the water passing through the condensate chamber into the main chamber will not interfere with or accidentally actuate the float.

From the foregoing description it will be seen that I have perfected an extremely simple and effective steam trap in which the steam is protected from a condensing surface thereby insuring economical removal of moisture from steam separators, heating systems and other apparatuses where it is desirable to remove condensate as fast as it is formed but not to promote condensation.

It is to be understood that the form of the invention herein shown and described is to be taken as a preferred form of the same, and that various minor changes in the shape, size, and arrangement of parts may be resorted to without departing from the spirit of the invention or the scope of the subjoined claims.

I claim:

1. A trap of the class described comprising a substantially bulbous-shaped body composed of upper and lower sections detachably connected together, said lower section being equipped with a passage and a valve seat communicating with the passage, said upper section being equipped at its top with an internal integral partition which is substantially semi-spherical in shape and closely spaced from the top of said section to provide a comparatively small condensate collecting chamber, a condensed steam inlet discharging into said chamber, a plurality of circumferentially spaced tubes connected with said partition and depending into the main water collecting chamber, and a combined float and valve cooperable with said seat, said partition forming a guard for the float.

2. A trap of the class described composed of upper and lower substantially semi-spherical sections, the upper section carrying an internal substantially semi-spherical condensation collecting chamber provided with a guide socket, a condensate inlet pipe leading to the latter, the portion below said condensation chamber constituting a water collecting chamber, a discharge passage leading from the latter, the inner end of said passage extending upwardly and into said last named chamber and carrying a removable valve seat, a float in said collecting chamber provided with a valve for cooperation with said seat, and guide stems, one of which extends into said guide socket and the other of which extends down into the upwardly extending portion of the discharge passage, and a plurality of pipes extending from said first chamber down into the second chamber and below the normal water level therein.

3. A trap of the class described comprising a body including a main water collecting chamber, above which is a condensate collecting chamber, the bottom of said last named chamber being substantially semi-spherical shape and of a size to provide a float-guard, a condensed steam inlet discharging into the condensate chamber, an outlet leading from the main chamber, a conduit leading from the condensate chamber and extending down into the main chamber, the outlet end of the conduit extending below the normal water level in the main chamber, and a float valve cooperative with the aforesaid outlet and float-guard.

In testimony whereof I have hereunto set my hand.

JOHN C. F. LONG.

Witnesses:
F. L. RHOADES,
CLYDE C. LONG.